United States Patent
Perez

(10) Patent No.: US 6,412,615 B1
(45) Date of Patent: Jul. 2, 2002

(54) HYDRAULIC SHOCK ABSORBER FOR MOTOR VEHICLES

(75) Inventor: Laszlo Perez, Allershausen (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/663,133

(22) Filed: Sep. 15, 2000

(30) Foreign Application Priority Data

Sep. 15, 1999 (DE) .......................................... 199 44 183

(51) Int. Cl.[7] .................................................. F16F 9/48
(52) U.S. Cl. ........................ 188/284; 188/287; 188/281
(58) Field of Search .............................. 188/281, 282.1, 188/282.6, 284, 287; 267/64.22, 64.26, 64.11

(56) References Cited

U.S. PATENT DOCUMENTS

| | | | | |
|---|---|---|---|---|
| 1,064,204 A | * | 6/1913 | Furlow ........................ 188/287 |
| 1,238,498 A | * | 8/1917 | Dawley .................... 73/861.54 |
| 2,916,281 A | * | 12/1959 | Hehn .......................... 188/280 |
| 3,215,283 A | * | 11/1965 | Shaver ......................... 213/43 |
| 3,556,268 A | * | 1/1971 | Fister .......................... 188/268 |
| 4,438,909 A | * | 3/1984 | Matsumoto ................. 27/64.26 |
| 4,452,437 A | * | 6/1984 | Lochner ................... 267/64.22 |
| 5,014,966 A | * | 5/1991 | Wang ....................... 267/64.26 |
| 5,720,368 A | * | 2/1998 | Richardson ................. 188/287 |
| 5,862,895 A | * | 1/1999 | Ricard ........................ 188/289 |

FOREIGN PATENT DOCUMENTS

| | | | | |
|---|---|---|---|---|
| DE | 6604946 | 5/1970 | | |
| DE | 28 55 561 | 7/1980 | .............. 267/64.23 |
| DE | 40 28 785 | 3/1992 | ................. 188/284 |
| JP | 3117739 A | * | 5/1991 | ................. 18/284 |

* cited by examiner

*Primary Examiner*—Paul N. Dickson
*Assistant Examiner*—Melody M. Burch
(74) *Attorney, Agent, or Firm*—Crowell & Moring LLP

(57) ABSTRACT

A hydraulic shock absorber for motor vehicles produces additional damping, starting at a certain immersion depth of the piston rod. This takes place by an auxiliary cylinder positioned axially inside the cylinder which, when the piston rod is immersed, is closed by an auxiliary piston that moves at the same time. The associated pressure increase inside the hydraulic shock absorber causes a correspondingly designed valve to open inside the auxiliary cylinder. The fluid exchange that causes damping takes place between two working chambers of the cylinder through a connection of the two working chambers that runs through the auxiliary piston and reduces their opening cross section to the working chamber associated with the auxiliary piston by pushing the auxiliary piston into the auxiliary cylinder.

9 Claims, 1 Drawing Sheet

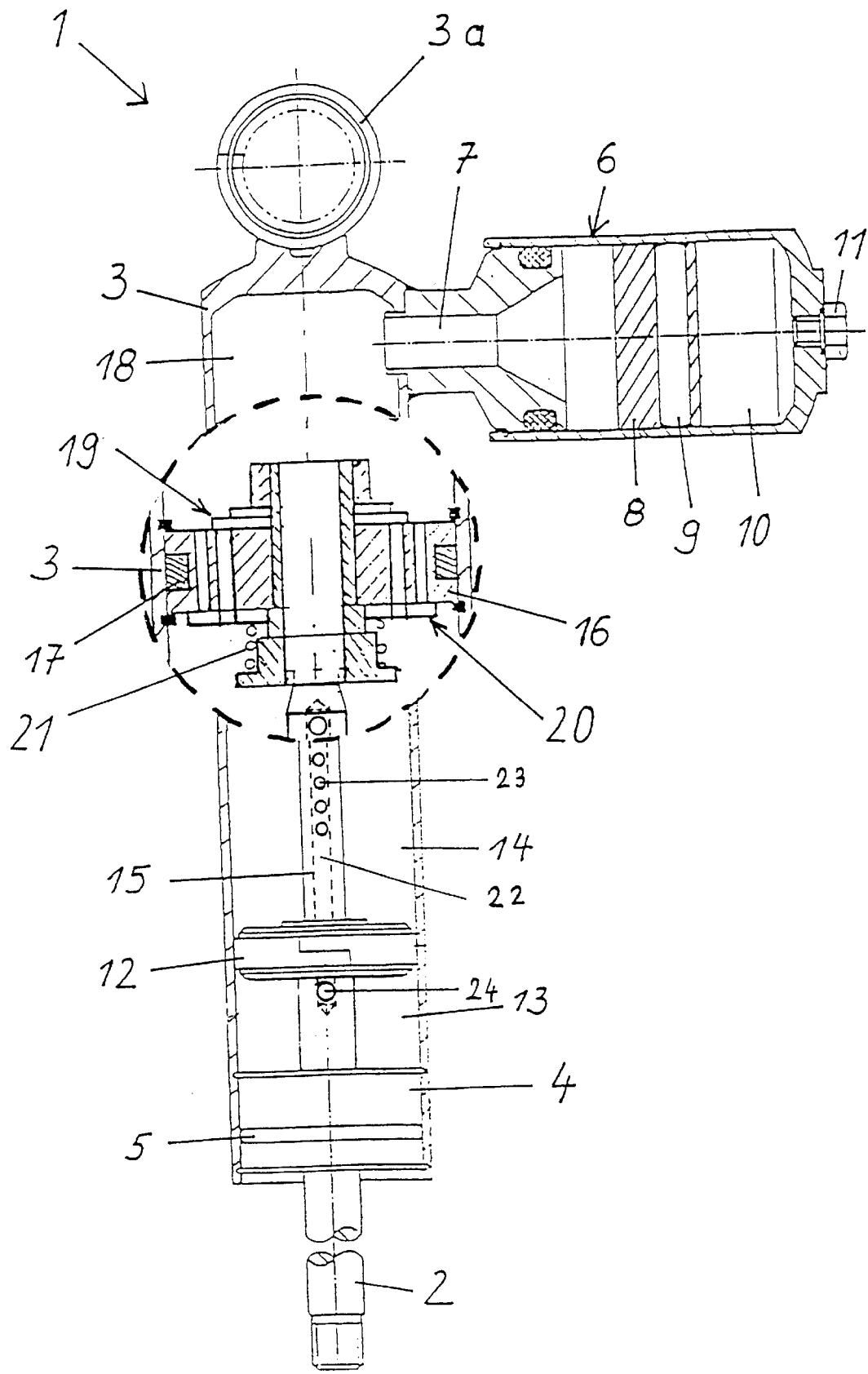

HYDRAULIC SHOCK ABSORBER FOR MOTOR VEHICLES

This application claims the priority of German patent document 19944183.9, filed Sep. 15, 1999, the disclosure of which is expressly incorporated by reference herein.

BACKGROUND AND SUMMARY OF INVENTION

The invention relates to a hydraulic shock absorber for motor vehicles. Preferred embodiments of the invention relate to a hydraulic shock absorber for motor vehicles comprisisng a fluid-filled cylinder in which a piston rod is immersed on one side with a main piston which displaceably separates two working chambers from one another inside the cylinder with fluid exchange, with the main piston bearing an auxiliary piston which enters an auxiliary cylinder fixed axially in the cylinder at the end of the immersion movement of the main piston, with the inlet opening of said auxiliary cylinder leading to a fluid-filled chamber with a volume that varies as a function of spring force and the pressure increase linked therewith when the inlet opening is sealed by the auxiliary piston in the working chamber associated with the auxiliary piston causes a valve to open that produces a connection from this working chamber to the fluid-filled chamber.

A shock absorber of this type is known from German Patent Document DE 40 28 785 A1. According to this document, the shock absorber consists of a fluid-filled cylinder in which a piston rod with a main piston is immersed on one side. This separates the interior of the cylinder into two working chambers. To produce the damping effect, through bores are provided on the main piston through which a fluid exchange takes place between the two working chambers as the main piston moves. The main piston carries an auxiliary piston which enters a fixed auxiliary cylinder at the end of the immersion movement of the main piston. A gap opening between the auxiliary piston and the auxiliary cylinder is designed so that it narrows as the depth of penetration of the auxiliary piston increases, and thus produces an increasing damping effect. The inlet opening on the auxiliary cylinder leads to a fluid-filled chamber with a volume that varies against spring force. With the inlet opening sealed by the auxiliary piston, the pressure increase associated therewith in the working chamber associated with the auxiliary piston causes a valve to open that produces a connection between this working chamber and the fluid-filled chamber.

With such a design for a hydraulic shock absorber, the degree of damping in the compression stage becomes much greater. The degree of damping in the suction stage is constant regardless of the damping travel.

A goal of the invention is to improve on a hydraulic shock absorber of the above noted type so that the shock absorber produces a travel-dependent damping effect in the suction stage as well.

This goal is achieved according to the invention by providing a hydraulic shock absorber of the above-noted type, wherein the fluid exchange between the two working chambers of the cylinder takes place through a connection of the two working chambers which extends through the auxiliary piston and whose opening cross section to the working chamber is reduced by pushing the auxiliary piston into the auxiliary cylinder.

Advantageous features of preferred embodiments of the invention are described below and in the claims.

According to the invention, a hydraulic shock absorber for motor vehicles consists of a fluid-filled cylinder in which a piston rod with a main piston is submerged on one side. The piston displaceably separates two working chambers within the cylinder with fluid exchange, with the main piston carrying an auxiliary piston which at the end of the immersion movement of the main piston enters an auxiliary cylinder mounted axially in the cylinder whose inlet opening leads to a fluid-filled chamber with a volume variable against spring force. When the inlet opening is closed by the auxiliary piston, the pressure increase associated therewith in the working chamber associated with the auxiliary piston causes a valve to open, producing a connection between this working chamber and the fluid-filled chamber. The invention is characterized by the fact that fluid exchange between the two working chambers of the cylinder occurs through at least one connection between the two working chambers that runs through the auxiliary piston and whose opening cross section to the working chamber is reduced by pushing the auxiliary piston into the auxiliary cylinder.

A hydraulic shock absorber thus designed damps increasingly softly in the suction stage as the extension increases. In the compression stage, damping takes place by the fluid exchange between the two working chambers of the cylinder through the connection between the two working chambers that runs through the auxiliary piston, continuously over the compression distance.

One embodiment of the subject of the invention is characterized by the fact that the connection of the two working chambers runs through the auxiliary piston and through the piston rod, with the latter abutting one another in the axial direction, being made hollow, and having at least one opening each in the radial direction to the corresponding working chamber. The opening of the auxiliary piston to the working chamber is designed so that it is sealed by the auxiliary cylinder during an immersion movement of the auxiliary piston into the auxiliary cylinder.

Such a design of the subject of the invention is advantageously easy to make.

According to another feature of preferred embodiments of the subject of the invention, the auxiliary piston has a plurality of radially directed openings to the working chamber associated therewith, said openings being arranged in the axial direction so that they are closed in succession when the auxiliary piston is immersed in the inlet opening. This has the advantage that the openings in the auxiliary piston can be mounted very simply and precisely, for example as bores of different sizes with regular or irregular axial distances from one another as required for the desired influence of the damping behavior of the shock absorber.

Another advantage of the invention can be considered to be the fact that the kinematic steering systems that are conventional today are no longer necessary when a telescopic shock absorber is articulated to a rear wheel roller by using a damper according to the invention. Maintenance- and wear-intensive parts with bearings on a motorcycle chassis are reduced considerably thereby.

Other objects, advantages and novel features of the present invention will become apparent from the following detailed description of the invention when considered in conjunction with the accompanying drawings.

BRIEF DESCRIPTION OF THE DRAWINGS

The single drawing figure is a schematic sectional view of a hydraulic shock absorber constructed according to a preferred embodiment of the invention.

DETAILED DESCRIPTION OF THE DRAWINGS

In its single figure the drawing shows a hydraulic shock absorber 1 with a piston rod 2 immersed in a cylinder 3 on one side. Cylinder 3 has a fastening eye 3a at its upper end to which the body of a motorcycle is fastened in a manner not shown in detail. Piston rod 2 has a connection not shown in the drawing with the hub of a vehicle wheel. An additional connection between the vehicle body and this wheel hub, as is known and therefore not shown, is provided by a suitable vehicle suspension.

Cylinder 3 is filled with fluid protected by a circular lid 4 with a seal 5 from escaping from cylinder 3. A seal not visible in the drawing is provided between lid 4 and piston rod 2 for this purpose.

An expansion tank 6 is welded to the upper end of cylinder 3 and communicates through an opening 7 with the fluid inside cylinder 3. Inside expansion tank 6 a displaceable piston 8 separates the fluid inside cylinder 3 from a gas-filled chamber 10. A seal 9 on piston 8 as well as a correspondingly sealed screw 11 in an opening is therefore provided on the expansion tank seal chamber 10, gas-tight. The gas is loaded under pressure before hydraulic shock absorber 1 is put into service in order to allow the fluid in cylinder 3 to adjust when piston rod 2 is inserted and expansion due to heat takes place.

Piston rod 2 carries a main piston 12 that divides the interior of cylinder 3 into two working chambers 13 and 14. A fluid exchange producing damping takes place between working chambers 13 and 14 through openings not shown in the drawing within main piston 12 when the piston rod and main piston 12 are moved opposite cylinder 3.

Main piston 12 has at its upper end an auxiliary piston 15 with a conically tapered end which can be seen in the drawing within the dashed area shown enlarged. In this area, there is also an auxiliary cylinder 16 associated with auxiliary piston 15 positioned axially on cylinder 3 by suitable means. Auxiliary cylinder 16 separates working chamber 14 from an additional fluid-filled chamber 18 inside cylinder 3.

Auxiliary cylinder 16 has on its outer circumference a seal 17 which prevents fluid exchange at this point between working chamber 14 and chamber 18.

Until auxiliary piston 15 enters auxiliary cylinder 16, the fluid damping produced by main piston 12 operates only inside hydraulic shock absorber 1. When auxiliary piston 15 enters auxiliary cylinder 16, the conically tapered end of auxiliary piston 15 initially ensures that the damping effect is increased within hydraulic shock absorber 1. As soon as auxiliary piston 15 enters auxiliary cylinder 16 by its cylindrical portion, chamber 18 and working chamber 14 are separated from one another in a fluid-tight manner.

Consequently, the pressure increased in working chamber 14 no longer is applied to gas-sprung piston 8. The higher pressure in working chamber 14 acts on an open valve 19 as a function of a limiting pressure on auxiliary cylinder 16 so that an additional immersion movement of piston rod 2 into cylinder 3 takes place with additional damping produced thereby. The top of valve 19 will not be discussed further in the following since it is a generally known technical feature. This also applies to a check valve 20 which is sealed off from chamber 18 when there is pressure in working chamber 14 and opens when the situation is reversed. Then auxiliary piston 15 can move outward and then downward, easily and therefore rapidly out of auxiliary cylinder 16. A coil spring 21 lightly pretensioned on auxiliary cylinder 16 provides for noiseless opening of check valve 20. In addition, auxiliary piston 15 and piston rod 2, abutting one another, are made partially hollow in the axial direction and auxiliary piston 15 has a plurality of radially directed openings 23 to connect this hollow chamber 22 with working chamber 14, said openings being so arranged in the axial direction so that they are closed sequentially when auxiliary piston 15 enters the inlet opening. Piston rod 2 has a radially directed opening 24 to connect cavity 22 with working chamber 13. In this manner, the two working chambers are connected with one another so that a damping fluid exchange can take place between them, in addition to that produced by the openings, not shown, inside main piston 12.

The effect of this additional damping fluid exchange however is different since openings 23 are closed sequentially as the auxiliary piston 15 enters the inlet opening. During deflection in the compression stage, openings 23 of auxiliary cylinder 16 are closed successively, so that damping increases continuously as a function of travel until openings 23 are completely covered by auxiliary cylinder 16. Maximum additional damping is achieved only when openings 23 are completely covered.

During extension in the suction stage, openings 23 are initially covered by auxiliary cylinder 16, so that a damping fluid exchange can take place only through the openings, not shown, inside main piston 12. Damping is therefore hard. As extension increases, openings 23 are exposed and suction damping becomes softer as extension increases.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulic shock absorber for motor vehicles comprising a fluid-filled cylinder in which a piston rod is immersed on one side with a main piston which displaceably separates first and second working chambers from one another inside the fluid-filled cylinder with the main piston bearing an auxiliary piston which enters an auxiliary cylinder fixed axially in the fluid-filled cylinder at the end of an immersion movement of the main piston, with an inlet opening of said auxiliary cylinder leading to a fluid-filled chamber with a volume that varies as a function of a spring force and pressure increase linked therewith when the inlet opening is sealed by the auxiliary piston in the first working chamber, causing a valve to open that produces a connection from the first working chamber to the fluid-filled chamber, wherein fluid exchange between the first and second working chambers of the fluid-filled cylinder takes place through a connection of the first and second working chambers which extends through the auxiliary piston, the connection having an opening to the first working chamber and an opening to the second working chamber and wherein the opening to the first working chamber is reduced by pushing the auxiliary piston into the auxiliary cylinder and is increased by pulling the auxiliary piston out of the auxiliary cylinder.

2. The hydraulic shock absorber according to claim 1, wherein the connection of the first and second working chambers extends through the auxiliary piston and the piston rod, with the piston rod being made hollow in the axial direction and in the radial direction, with the opening of the connection to the first working chamber being shaped so that it is sealed by the auxiliary cylinder during an immersion movement of the auxiliary piston into the auxiliary cylinder.

3. The hydraulic shock absorber according to claim 2, wherein the opening of the connection to the first working chamber includes has a plurality of radially directed openings to the first working chamber, arranged on the auxiliary piston in the axial direction so that the openings are closed sequentially as the auxiliary piston is immersed in the inlet opening.

4. A hydraulic shock absorber for motor vehicles, comprising:

a fluid-filled cylinder, a piston rod immersed in the fluid-filled cylinder and carrying a main piston which separates first and second chambers inside the fluid-filled fluid-filled cylinder, an auxiliary cylinder fitted axially in the fluid-filled cylinder and separating the first working chamber from a fluid-filled filled chamber, and an auxiliary piston carried by the piston rod above the main piston and operable in use to be immersed in the auxiliary cylinder during springing movements of the shock absorber to control flow between the first working chamber and the fluid-filled chamber, wherein fluid exchange between the,working chambers is controlled by a fluid connection through the auxiliary piston which has an opening to the first working chamber that is reduced by pushing the auxiliary piston into the auxiliary cylinder and is increased by pulling the auxiliary piston out of the auxiliary cylinder.

5. The hydraulic shock absorber according to claim 4, comprising an expansion tank connected with the fluid-filled chamber.

6. The hydraulic shock absorber according to claim 4, wherein the opening of the fluid connection to the first working chamber is positioned on the auxiliary piston and includes a plurality of radially directed openings to the first working chamber which are closed sequentially when the auxiliary piston is immersed in the auxiliary cylinder.

7. The hydraulic shock absorber according to claim 6, wherein the auxiliary piston includes an axial bore connecting the plurality of radially directed openings to the first working chamber with a radially directed opening to the second working chamber.

8. The hydraulic shock absorber according to claim 1, wherein the first working chamber is an upper chamber and the second working chamber is a lower chamber.

9. The hydraulic shock absorber according to claim 4, wherein the first working chamber is an upper chamber and the second working chamber is a lower chamber.

\* \* \* \* \*